United States Patent Office 3,516,926
Patented June 23, 1970

3,516,926
CATALYST SULFIDING WITH CARBON DISULFIDE
Joseph R. Davis, Jr., Wallingford, Pa., John D. Tice, Wilmington, Del., and Robert I. Benner, Upper Chichester, Pa., assignors to Sun Oil Company, Philadelphia, Pa., a corporation of New Jersey
No Drawing. Filed May 10, 1968, Ser. No. 728,355
Int. Cl. C10g 23/02; B01j 11/74
U.S. Cl. 208—143
9 Claims

ABSTRACT OF THE DISCLOSURE

A sulfiding process for sulfactive hydrogenation catalysts of Groups VI and VIII of the Periodic Table by passing carbon disulfide dissolved in a carrier oil and hydrogen over the catalyst stock at a temperature of 350° to 550° F. under a pressure of at least 400 p.s.i.g.

---

This invention relates to the preparation of a highly active metal sulfide catalyst used in hydrogenation refining of petroleum fractions. More particularly, this invention relates to a highly reliable method of preparing a nickel-molybdenum sulfide as the sulfiding agent and wherein deactivation from high temperatures is minimized.

Background of the invention

As those in the chemical arts well know, the predictability and even explanation of a certain catalytic activity, or better the catalytic effect, confounds the most highly skilled artisans. Catalysis is known to be very complex and among the most difficult areas of the general science of chemistry. This characteristic holds especially true for the well-known metal sulfide catalysts employed in hydrogenation refining of petroleum fractions. The preparation of catalysts that are nominally active is well known, but little is known about why a catalyst has a particular artivity and to a degree how an active catalyst can consistently be obtained. The great difficulty is caused in part by the magnified complexities of the plural function of such catalysts. The discovery of any worthwhile improvement in catalytic effect in such technology is accordingly to be highly commended.

According to prior art techniques, the sulfiding may be done with any sulfur-containing compounds which form $H_2S$ in the presence of hydrogen under the conditions employed. Typically, the sulfiding is done in gaseous or vapor phase and usually with $H_2S$ gas (since, according to the prior art, $H_2S$ generally produces a slightly superior catalyst) and hydrogen. It would be commendable to provide a catalyst of high activity using less expensive, less hazardous, and easier-to-handle carbon disulfide for sulfiding in lieu of the preferred hydrogen sulfide. Others highly skilled in the art have some difficulty in being able to repeatedly prepare highly active catalysts at lower temperatures even with $H_2S$ as the sulfiding agent. They find it necessary to carry out additional sulfiding at higher temperatures when the catalyst does not prove to be adequately active after the initial sulfiding at their combination of sulfiding conditions. Also, they frequently find pretreatments necessary or at least preferred. For example, the prior art teaches that the catalyst stock (i.e., in the oxide form) should be pretreated with steam.

We not only find that this pretreatment is not necessary but also that pretreatment with steam in particular frequently has an adverse effect on the catalyst. Although the catalyst activity does not necessarily correlate with the total sulfur takeup by the catalyst, a high sulfur takeup is necessary and is achieved using our activating procedure. Since the catalyst is temperature-sensitive in terms of catalyst life, it would be commendable to provide a sulfiding technique which could minimize the high temperatures that shorten the life of said catalyst but which catalyst is very high in activity in all the important aspects in hydrogenating oils, especially naphthenic base oils. The procedure of the present invention does accomplish this and other objectives.

Summary of the invention

We have therefore found, quite unexpectedly and for reasons not fully understood, that when a sulfactive metal catalyst stock is sulfided with about 0.5 to 2 volume percent carbon disulfide dissolved in a carrier oil and hydrogen comprising charging the carbon disulfide so dissolved under the proper combination of conditions at a liquid hourly space rate of about 0.25 to 6 v./v./hr. (i.e., volumes of liquid per volumes of catalyst per hour) and with makeup hydrogen gas sufficient to maintain a pressure of about 400 to 4000 p.s.i.g. until the sulfur input to the reactor equals the sulfur output of the reactor. In more detail, this inventive process comprises sulfiding a nickel oxidemolybdenum oxide combination catalyst in liquid phase with about 0.5 to 2% by volume of carbon disulfide dissolved in a carrier oil at a liquid hourly space rate of about 0.25 to 3 and with makeup hydrogen gas sufficient to maintain pressure, more usually in the range of about 500 to 1500 p.s.i.g., at a temperature in the range of about 350° to 550° F. until sulfur output from the reactor equals sulfur input to the reactor. A particularly advantageous embodiment of this invention is wherein said catalyst is employed to hydrogenate a lube oil at a temperature in the range of about 575° to 625° F., a pressure of about 800 to 4000 p.s.i.g., and at a liquid hourly space rate in the range of about 0.1 to 5.0, and wherein liquid recycle is employed in said hydrogenation process whereby enhanced reduced UV absorptivity of said lube oil is obtained.

Detailed description

Catalysts which can be prepared by this process are broadly any of the sulfactive hydrogenation catalysts. These are well known in the art and are members of Groups VI and VIII of the Periodic Table. Examples are tungsten, chrominum, molybdenum, cobalt, iron, nickel, platinum, etc., and sulfides or mixtures of such metal sulfides. Generally, the oxide forms of the metals are sulfided rather than the free metal. Any of the well-known catalyst carriers may be employed, as such carriers as activated carbon, alumina, bauxite, charcoal, clay, kieselguhr, magnesia, pumice, silica, silica-alumina compositions, etc. The preferred catalyst are combinations of nickel-molybdenum and cobalt-molybdenum and especially those defined in British Pat. 1,024,317 published Mar. 30, 1966. The nickel-molybdenum oxides so prepared are the preferred catalyst material. These are commercially available containing about 3% of nickel oxide and about 10 to 15% molybdenum oxide.

The time required for sulfiding normally requires several hours. Typically, about 36 hours is required to fully sulfide a catalyst using about 1% by volume of $CS_2$ in the oil fraction carrier. Good results have been obtained on charging a minimum of about 0.32 pound $CS_2$ per pound of catalyst, although lesser amounts can suffice in some cases and greater amounts will be required in other cases. It is important to continue sulfiding for several hours after $H_2S$ breakthrough in order to fully sulfide the entire bed, as the most active catalyst is not obtained if sulfiding is stopped on $H_2S$ breakthrough. When a typical naphthenic of about 100 SUS at 100° F. is used as the carbon disulfide carrier oil, its color lightens as the sulfiding progresses; and when it is water white for a period of time, sulfiding can be regarded as complete. Another convenient test for determining when sulfiding is essentially complete is to analyze the $H_2S$ off-gas; when it reaches a substantially constant level for a period of time, sulfiding is complete. A more difficult but accurate test is to check the sulfur output; when it equals the sulfur input for a period of time, sulfiding is complete. Those skilled in the art will have little difficulty knowing when the sulfiding is complete from the foregoing discussion.

The temperature during sulfiding should be kept in the range of about 350° to 550° F. Although the temperature can exceed the upper limit for a brief period without rendering the catalyst completely inactive, it should be brought back down within the specified range as soon as possible to minimize adverse effects. Preferably, the temperature is kept in the more restricted range of 400° to 475° F.

The relative amount of carbon disulfide employed generally will be in the range of about 0.2 to 2.0 volume percent based on the petroleum fraction oil carrier. Preferably, however, about 0.5 to 1.0% by volume of $CS_2$ is employed. Such concentrations provide a substantially optimum balance of desiderata between maximum sulfiding rate without excessive heat generation from the exothermic heat or sulfiding, the oil carrier operating as a good heat sink to avoid excess temperatures.

Normally, the reactor is loaded with catalyst material, then pressured with hydrogen to design or operating pressures of about 500 to 1500 p.s.i.g. (higher pressures can be employed, for example, 4000 p.s.i.g., the limit being determined by design limitations of the equipment since in theory it is without limit), but preferably about 800 to 1200 p.s.i.g.; and the oil carrier, which is usually the feed to be ultimately hydrogenated and which is preheated to about 350° to 400° F., is charged to the reactor and thereby the catalyst to be sulfided is heated to a temperature of about 325° to 350° F. Relatively mild temperatures within the broad range indicated hereinabove, however, are to be employed in order to avoid reducing the oxide catalyst stock to the free metal by the hydrogen. The carbon disulfide is then added to the carrier oil to achieve the desired concentration, and the carrier oil and carbon disulfide mix is charged to provide for a liquid hourly space rate of same of from about 0.25 to 6 but preferably from about 0.5 to 3.0. Generally, the carrier oil employed is the ultimate feed to be charged to the unit for hydrogenation thereof; however, in the case of the more viscous charge stocks, a suitable lower viscosity stock is preferably employed alone or as a diluent in the sulfiding operation. Alternatively, a carrier oil different from the contemplated hydrogenation feed may be employed alone during the sulfiding operation; and the carrier oil is then displaced by the regular feed when sulfiding is complete. Illustrative examples of suitable diluents and suitable carrier oils are naphthas and low viscosity lube oils. Usually, however, where a lower viscosity is desired, the lower viscosity material is used alone because it is a simpler operation. To facilitate the understanding of the invention, illustrative embodiments will now be set forth.

Illustrative examples

In a series of comparative sulfiding runs, a commercial extruded nickel oxide-molybdenum oxide catalyst sold by the American Cyanamid Company under the designation of Aero HDS-3A was loaded into a small scale reactor (i.e., about 36" in length and about 1½" in diameter). The reactor was then pressured with a hydrogen stream, the pressure and hydrogen stream being further identified hereinafter in the table. A naphthenic lube oil of about 100 SUS at 100° F. in each instance was heated to about 350° F. and passed through the catalyst bed at a liquid hourly space velocity of about 0.5 to heat same to about 350° F. When the catalyst bed reached about 350° F., carbon disulfide in an amount of about 1 volume percent based on the lube oil charge was then added to the charge stream and the temperature of the bed was increased to about 450° F. The sulfiding with the carbon disulfide dissolved in the lube oil was continued for about 36 hours with sufficient hydrogen addition to maintain the desired pressure indicated in the table hereinbelow. In order to avoid the possibility of obtaining a false activity rating of the new sulfided catalyst, a break-in hydrogenation run of about 24 hours in duration was carried out using the 100 SUS naphthenic lube oil at about 550° F. and about 1000 p.s.i.g. in all cases.

Following the break-in run, the catalyst was used to hydrogenate a naphthenic lube oil of higher viscosity to remove color bodies and to increase its stability by reducing its UV absorption particularly at 260 m$\mu$. The viscosity of the lube treated was about 90 SUS at 210° F. and 2500 SUS at 100° F.

The hydrogenation conditions in each case where a temperature of about 600° F., a pressure of about 1000 p.s.i.g. using a purchased hydrogen stream of about 100% hydrogen, a fresh feed charge at a space velocity of about 0.5, and a liquid recycle employed to provide a total liquid hourly space velocity of about 4.0. The sulfiding conditions and resuls of the respective hydrogenation were as follows:

| Sulfiding conditions | Catalyst number | | | |
|---|---|---|---|---|
| | 1 | 2 | 3 | 4 |
| Pressure, p.s.i.g. | 1,250 | 1,250 | 1,000 | 1,250 |
| Makeup hydrogen purity | 80 | 80 | 100 | 80 |
| Product properties after hydrogenation: | | | | |
| UV (260 m$\mu$) | ¹ 3.3 | 3.4 | 3.9 | 3.8 |
| Color (D-1500) | | 0.5 | 0.75 | 0.75 |

¹ Corrected from 2.9 because of a variation in the hydrogenation evaluation.

It can be clearly seen that the catalyst in all cases was very active as evidenced by both the color and the UV absorption properties of the product. This activity has also been confirmed by runs carried out on a much larger scale involving several thousand pounds of catalyst charge. The catalyst so prepared has also been shown to be highly active in hydrogenating other petroleum fractions, the naphthenic lubes in particular.

What is claimed is:

1. A process of preparing highly active sulfactive hydrogenation catalysts comprising charging hydrogen and carbon disulfide dissolved in a carrier oil, wherein said carbon disulfide is present in said carrier oil in from 0.2 to 2 volume percent as based on said carrier oil, to a metal catalyst stock wherein said metal is selected from the group consisting of nickel, cobalt, molybdenum and mixtures under a pressure of at least about 400 p.s.i.g., and a temperature in the range of about 350° F. to 550° F., said process being further characterized as being without a steam pretreatment.

2. A process according to claim 1 wherein the catalyst is a combination of nickel and molybdenum.

3. A process according to claim 1 wherein the pressure is in a range of about 500 to 1500 p.s.i.g.

4. A process according to claim 3 wherein the dissolved carbon disulfide and carrier oil are charged to provide for a liquid hourly space rate of about 0.25 to 6.

5. A process according to claim 4 wherein said temperature is in the range of about 400° to 475° F.

6. A process according to claim 5 wherein the catalyst metal is a combination of nickel and molybdenum.

7. A process according to claim 6 wherein the carbon disulfide concentration in the carrier oil is in the range of about 0.5 to 1.0%, and the liquid hourly space rate is in the range of about 0.5 to 3.0.

8. A process according to claim 7 wherein the catalyst metal stock of nickel and molybdenum are a combination of about 3% nickel oxide and about 10 to 15% molybdenum oxide.

9. A process according to claim 8 wherein said catalyst so prepared is employed to hydrogenate a naphthenic lube oil at a temperature in the range of about 575° to 625° F., a pressure of about 500 to 4000 p.s.i.g., and at a liquid hourly space rate in the range of about 0.1 to 5.0, and wherein liquid recycle is employed in said hydrogenation process whereby enhanced reduced UV absorptivity of said naphthenic lube oil is obtained.

References Cited

UNITED STATES PATENTS

| | | | |
|---|---|---|---|
| 3,215,640 | 11/1965 | Pitkethly et al. | |
| 3,238,269 | 3/1966 | Holmes et al. | |
| 3,287,258 | 11/1966 | Mason | 208—143 |
| 3,309,307 | 3/1967 | Bryant | 208—143 |

HERBERT LEVINE, Primary Examiner

U.S. Cl. X.R.

208—18; 252—439